United States Patent
Rosman et al.

(10) Patent No.: US 9,187,168 B2
(45) Date of Patent: Nov. 17, 2015

(54) NATURAL-PATH TEARSTRAPS AND STIFFENERS FOR SPHERICAL COMPOSITE PRESSURE BULKHEADS

(71) Applicant: The Boeing Company, Chicago, IL (US)

(72) Inventors: Richard R. Rosman, Seattle, WA (US); Joseph H. Campana, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 95 days.

(21) Appl. No.: 13/954,145

(22) Filed: Jul. 30, 2013

(65) Prior Publication Data

US 2015/0037541 A1    Feb. 5, 2015

(51) Int. Cl.
*B32B 3/14* (2006.01)
*B64C 1/10* (2006.01)

(52) U.S. Cl.
CPC .......................................... *B64C 1/10* (2013.01)

(58) Field of Classification Search
CPC ..................... Y10T 428/24083; B29C 70/386; B29C 70/30; E04B 7/102; E04B 7/105; B64C 1/10
USPC .......................................................... 428/108
See application file for complete search history.

(56) References Cited

U.S. PATENT DOCUMENTS

| 6,378,805 | B1 | 4/2002 | Stephan | |
| 7,900,405 | B1 * | 3/2011 | Jacoby | ............................ 52/81.3 |
| 2010/0233421 | A1 * | 9/2010 | Lind et al. | ...................... 428/108 |

FOREIGN PATENT DOCUMENTS

| DE | 3844080 A1 | 7/1990 |
| EP | 1151917 B1 | 3/2004 |
| EP | 1535726 A1 | 6/2005 |
| EP | 1816070 A2 | 8/2007 |
| WO | 2008137379 A2 | 11/2008 |

* cited by examiner

*Primary Examiner* — Alexander Thomas
(74) *Attorney, Agent, or Firm* — Felix L. Fischer

(57) ABSTRACT

A bulkhead employs a substantially spherical dome having a periphery and an apex with an axis perpendicular to the dome at the apex. A first plurality of straps emanate from a periphery of the dome on geodesics defined by a first pair of virtual poles beyond the periphery of the dome. A second plurality of straps emanate from the periphery of the dome on second geodesics defined by a second pair of virtual poles beyond the periphery of the dome, wherein any overlap on an individual strap in the first plurality of straps is singular to only one individual strap in the second plurality of straps.

18 Claims, 6 Drawing Sheets

NATURAL-PATH TEARSTRAPS AND STIFFENERS FOR SPHERICAL COMPOSITE PRESSURE BULKHEADS

BACKGROUND INFORMATION

1. Field

Embodiments of the disclosure relate generally to the composite structures and more particularly to a composite layup employing perpendicular geodesic arrangement for tear straps and stiffeners on spherical or near-spherical composite pressure bulkheads with each strap having only a single overlap with one other strap.

2. Background

Bulkheads in composite structures such as aircraft fuselages and other aerospace structures may provide a web for pressure integrity with tear straps and stiffeners to provide required structural strength and damage resistance. Many bulkheads are curved and employ partial spherical or near spherical shape of the web. As shown in a prior art example in FIG. 1, straps and stiffeners 2 are typically arranged extending from a peripheral circumference 4 to a central apex 6 of a bulkhead 8. As the straps and stiffeners ascend toward the apex 6 they begin to geometrically merge and begin to overlap, or are terminated, as exemplified at points 9, to avoid overlapping. For structural continuity, certain straps must overlap at the apex 6 resulting in multiple layer overlaps at the apex. The need to terminate straps to avoid overlap requires complex termination designs and overlapping of multiple straps, particularly at the apex, creates undesirable thickness or buildup in the structure.

It is therefore desirable to provide a structural arrangement of tear straps and stiffeners for bulkhead designs to eliminate termination requirements and avoid multiple overlaps.

SUMMARY

Embodiments disclosed herein provide a bulkhead which employs a substantially spherical dome portion having a periphery and an apex with an axis perpendicular to the dome at the apex. A first plurality of straps emanate from a periphery of the dome on geodesics defined by a first pair of virtual poles beyond the periphery of the dome. A second plurality of straps emanate from the periphery of the dome on second geodesics defined by a second pair of virtual poles beyond the periphery of the dome, wherein any overlap on an individual strap in the first plurality of straps is singular to only one individual strap in the second plurality of straps.

The embodiments provide a method for placing tear straps or stiffeners on a bulkhead by forming a substantially spherical dome. A predetermined relative angle is defined and a first principal plane and second principal plane extending through an apex of the dome are established at the relative angle. Virtual poles are defined by the first and second principal planes beyond a peripheral circumference of the dome. Geodesic forming planes are offset from the first and second principal planes at predetermined angular offsets and corresponding geodesics on a surface of the dome are identified. Strap positions are determined by the identified geodesics, resulting in only single overlaps of straps at intersection of the geodesics.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide natural path composite layup for tear straps and stiffeners on a structural dome forming a spherical or near-spherical composite pressure bulkhead employing a geodesic arrangement determined based on virtual poles beyond the extent of the peripheral circumference of the dome with each strap having only a single overlap with one other strap.

Figure 1:
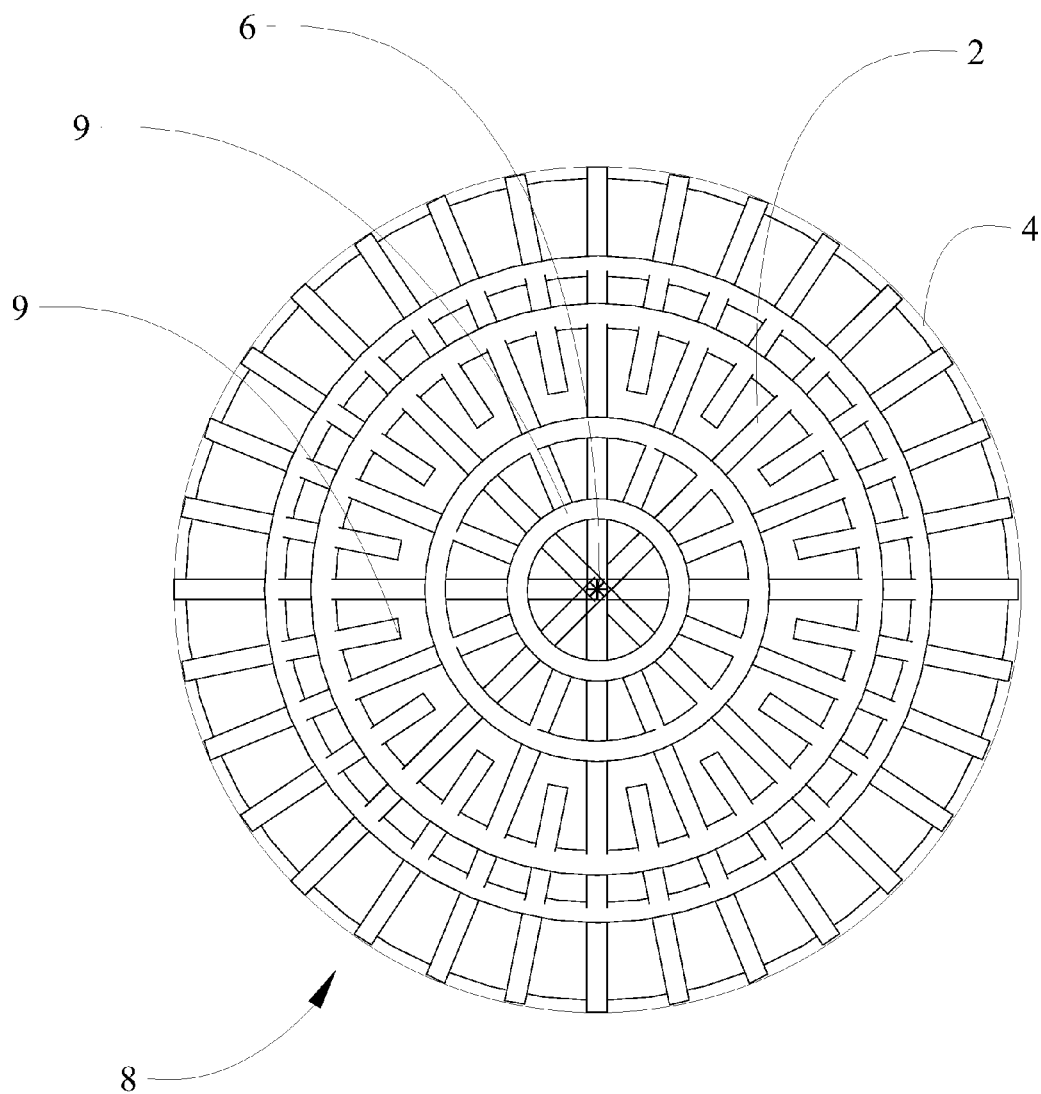
FIG. 1 is a front view of a prior art composite bulkhead.
Figure 2A:
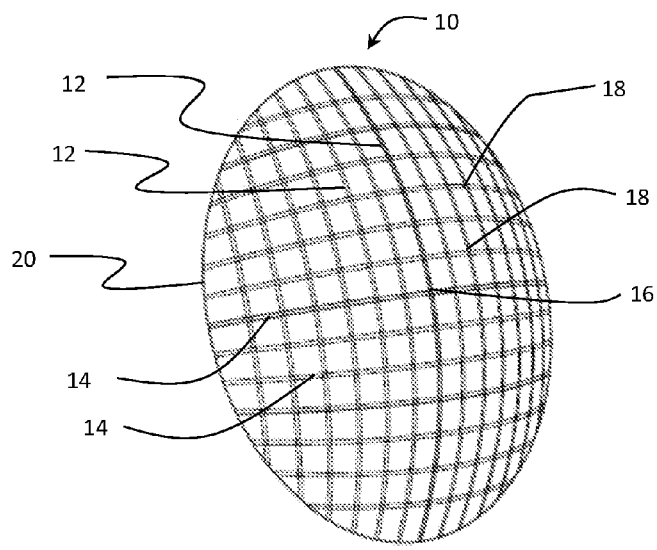
FIGS. 2A-C are isometric, side and front views of a current embodiment for a partial spherical bulkhead.
Figure 2B:
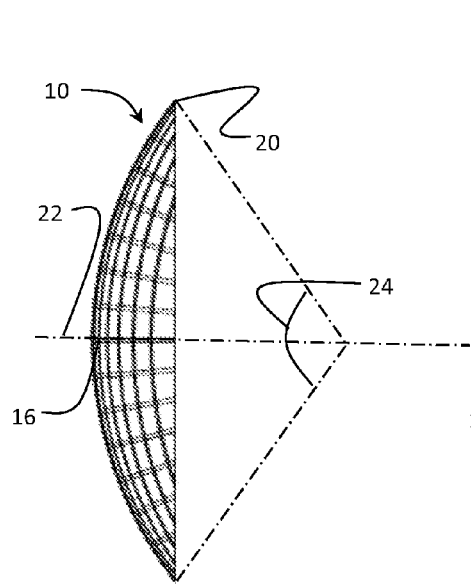
Figure 2C:
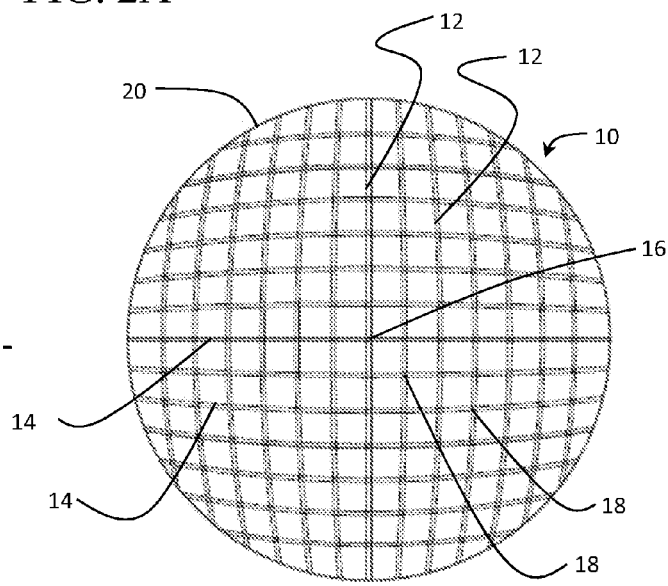

Referring to the drawings, FIGS. 2A-C show a first embodiment for a shallow substantially spherical cap or dome 10 having tear straps and/or stiffeners, referred to jointly as straps 12 oriented in a first direction and straps 14 oriented in a second direction relative to an apex 16 of the dome (only two straps in each direction are labeled with element numbers for clarity in the drawing). As seen in the drawing, straps 12 and straps 14 only overlap one strap at any overlap location 18 (a single overlap location is provided with an element number as exemplary). Strap overlap may be accomplished with a simple overlay of one strap (or stiffener) over another, regardless of the layups. Alternatively, a more complex configuration may be employed where two straps of multiple plies intersect. In this case, the intersection intersperses plies from the first strap could with those of the second strap.

A seen in FIGS. 2B and 2C, the straps 12 and 14 emanate from the periphery 20 of the dome and are located on geodesic curves or geodesics emanating from virtual poles which will be described in greater detail subsequently. Termination of the straps at the periphery is accomplished in one exemplary embodiment with all plies ending concurrently at the edge of the bulkhead. Alternatively, for straps with multiple plies the plies of the straps may be terminated in steps as the strap approaches the bulkhead edge. In example embodiments, a stiffener could also terminate concurrent with the edge of the bulkhead or may be specially trimmed to minimize the stress concentration. For the embodiment shown, the geodesic poles are orthogonally oriented with respect to each other and an axis 22 perpendicular to the surface of the dome through the apex 16. In alternative embodiments the geodesic poles may be oriented at other than orthogonal angles (the polar axes not perpendicular). Shallow domes subtend a portion of the spherical surface having a conical angle 24 of 45° or less as shown in FIG. 2B.

Figure 3A:
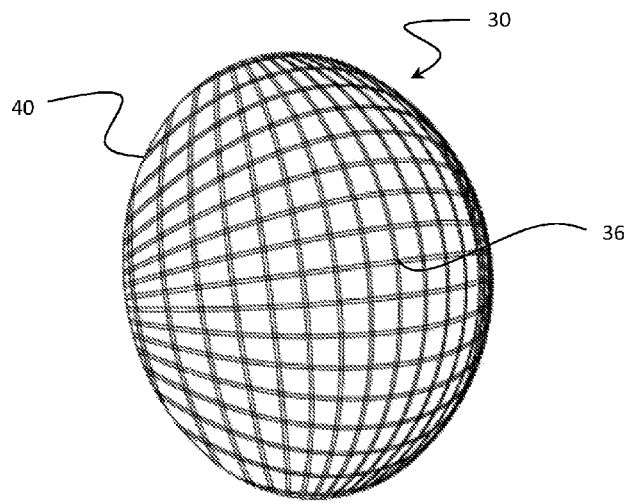
FIGS. 3A-C are isometric, side and front views of a second current embodiment for a hemispherical bulkhead.
Figure 3B:
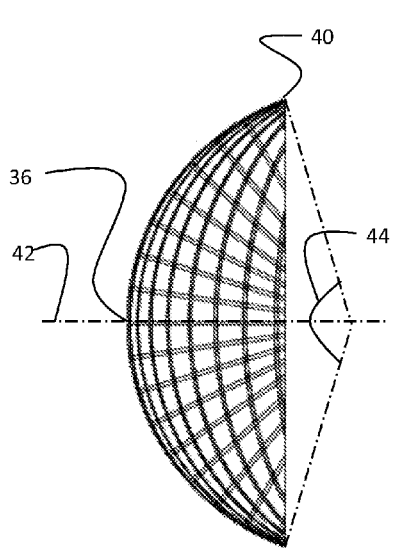
Figure 3C:
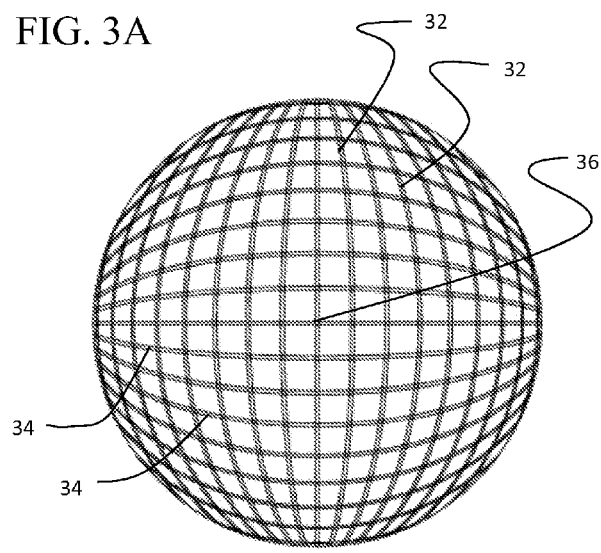

FIGS. 3A-C demonstrate a second embodiment for a deep dome 30. As in the prior embodiment, straps 32 are oriented in a first direction and straps 34 oriented in a second direction relative to an apex 36 of the deep dome 30. As seen in the drawing, straps 32 and straps 34 only overlap one strap at any overlap location 38. A seen in FIGS. 3B and 3C, the straps 32 and 34 emanate from the periphery 40 of the dome and are located on geodesic curves or geodesics emanating from virtual poles which will be described in greater detail geometrically subsequently. For the embodiment shown, the geodesic poles are orthogonally oriented with respect to each other and an axis 42 perpendicular to the surface of the dome through the apex 36. In alternative embodiments the geodesic poles may be oriented at other than orthogonal angles (the polar axes not perpendicular). Deep domes subtend a portion of the spherical surface having a conical angle 44 of more than 45° as shown in FIG. 3B.

Figure 4:
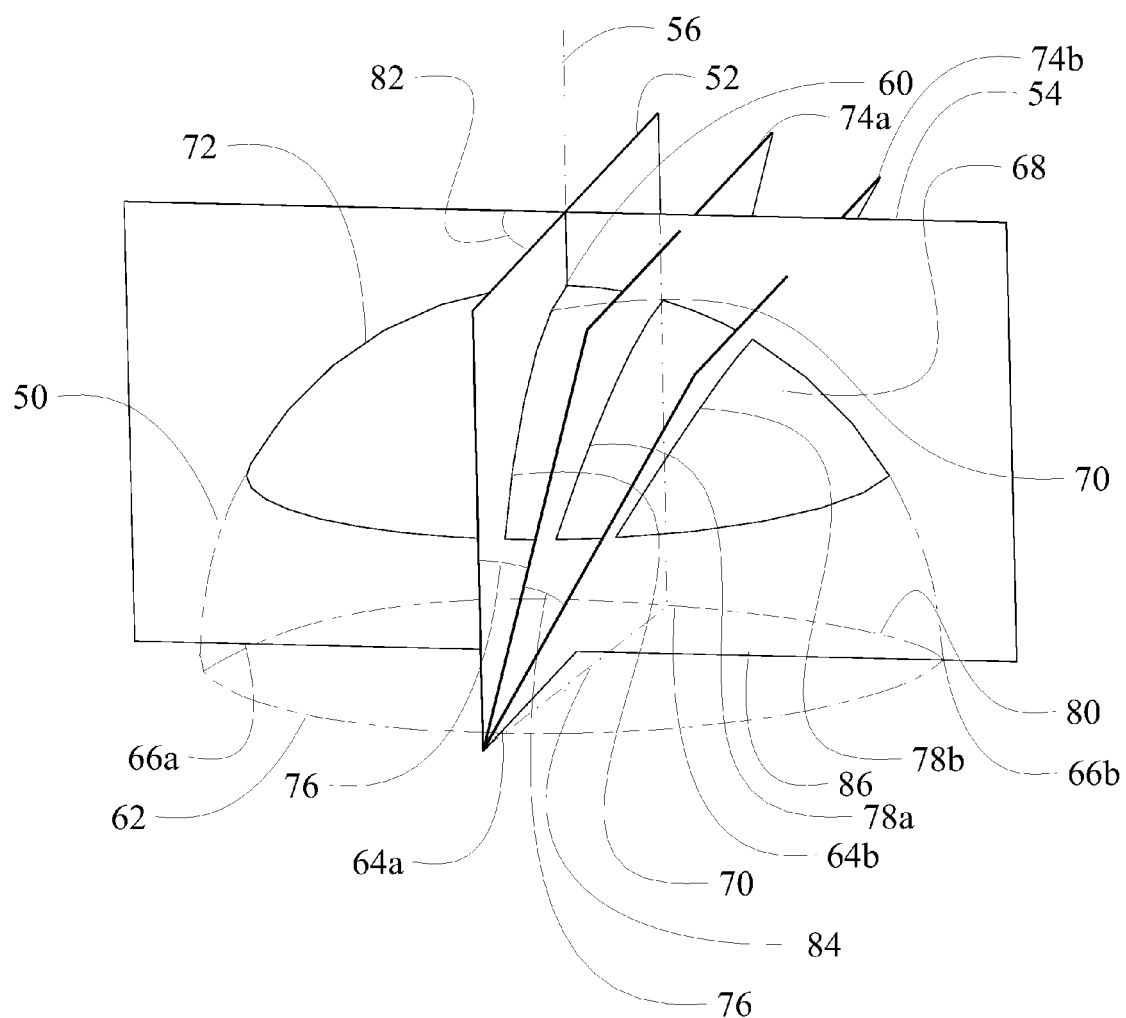
FIG. 4 is a depiction of example hemispheric planes defining the geodesics for placement of the tear straps or stiffeners; and, FIG. 5 is a depiction of an exemplary bulkhead with a non-circular periphery having a substantially spherical portion in the web.

FIG. 4 shows the geometrical arrangement of the geodesics and virtual poles for location of the straps 12, 14, 32 and 34 of the embodiments described previously. A hemisphere 50 is intercepted by a first principal plane 52 and a second principal plane 54 extending through an axis 56 extending from a spherical center 58 through an apex 60 (corresponding to axes 22 and 42 in the exemplary embodiments). Intersection of the first and second principal planes with the peripheral circumference 62 of the hemisphere 50 create a first pair of virtual poles 64a and 64b and a second pair of virtual poles 66a and 66b, respectively for a dome 68 corresponding to domes 10 and 30 of the exemplary embodiments. Intersection of the first principal plane 52 with the dome 68 creates a first geodesic 70 and intersection of the second principal plane 54 with the dome 68 creates a second geodesic 72.

Geodesic forming planes are oriented at predetermined angular offsets from the principal planes for creation of the geodesics on the dome. In FIG. 4, two exemplary forming planes 74a and 74b are shown with angular offsets 76 from first principal plane 52. Intersection of planes 74a and 74b with the dome 68 creates geodesics 78a and 78b which terminate at a peripheral circumference 80 of the dome 68 but geometrically extend to the virtual poles 64a and 64b which are beyond the peripheral circumference 80. Angular offsets 76 are shown as equal in the drawing for simplicity but may be any desired angle as may be determined by structural requirements for the dome straps in alternative embodiments. As seen in FIG. 4 first geodesic 70 also terminates at the peripheral circumference 80 but geometrically extends to the virtual poles 64a and 64b. Similarly, second geodesic 72 terminates at the peripheral circumference 80 but geometrically extends to the virtual poles 66a and 66b. In a manner similar to that described for geodesic forming planes 74 and 74b, geodesic forming planes are oriented at predetermined angular offsets from second principal plane 54 to create intersecting geodesics for creating a strap layout as demonstrated in the embodiments of FIGS. 2A-C and 3A-C. Straps overlap only at the intersection of the geodesics. For deep domes to maintain the virtual poles beyond the actual surface thereby avoiding multiple overlap of straps at a pole, depth of the dome is limited to approximately 85°. For those embodiments, straps corresponding to the first geodesic and second geodesic are present, overlapping at the apex. In alternative embodiments, straps may not be present on the first and second geodesics.

For the embodiment shown in FIG. 4, first principal plane 52 and second principal plane 54 are oriented through apex 60 with a predetermined relative angle 82 which is perpendicular. In alternative embodiments relative angle 82 may not be perpendicular and polar axes 84 and 86 between first pair of virual poles 64a and 64b and second pair of virual poles 66a and 66b, respectively, would not be orthogonal thereby creating non-orthogonal intersections (locations 18, 38) of the straps (12, 14 and 32, 34). Polar axes 84 and 86 are orthogonal to axis 56 through the apex.

Figure 5:
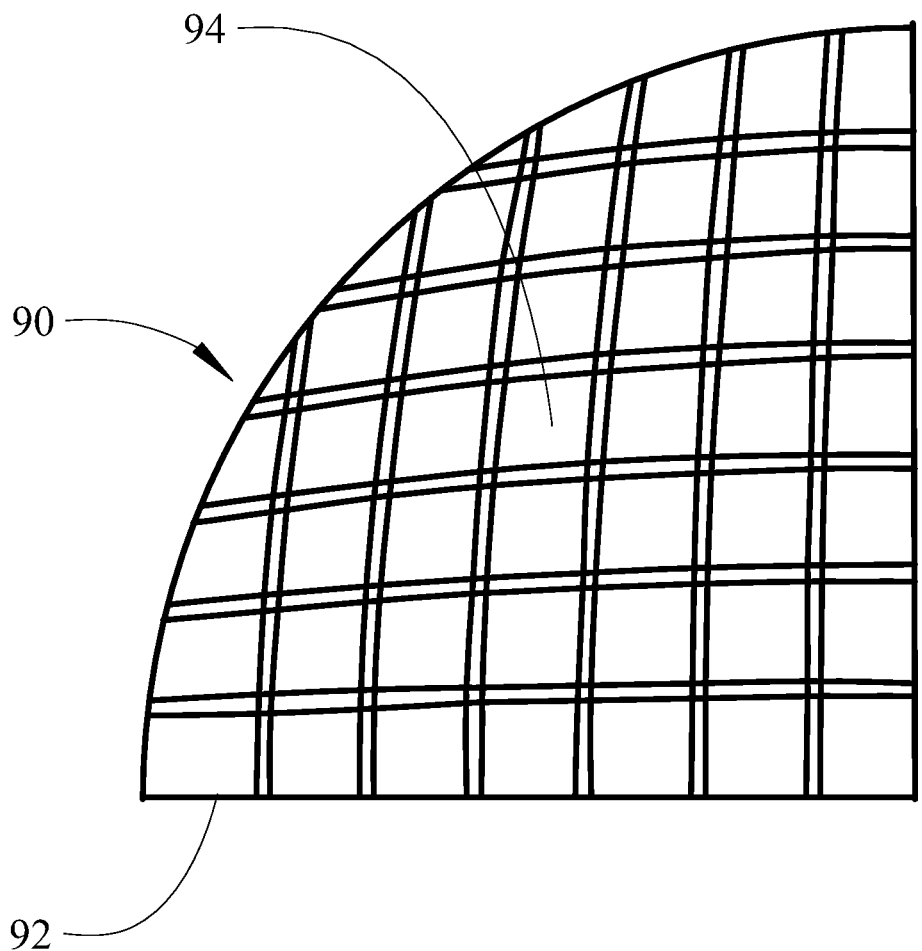

The present geodesic arrangement of straps may be employed in bulkheads 90 with non-circular boundaries 92 but with a substantially spherical portion 94 within the web, described as a "soap bubble membrane" as shown in FIG. 5. The geodesic planes establishing the geodesics for the spherical center portion are employed as described above and strap paths are then extended through the non-spherical portion of the bulkhead by minimizing distortion of a finite width strap or stiffener from a spherical termination circumference at the periphery of the dome to the edge of the bulkhead.

Figure 6:
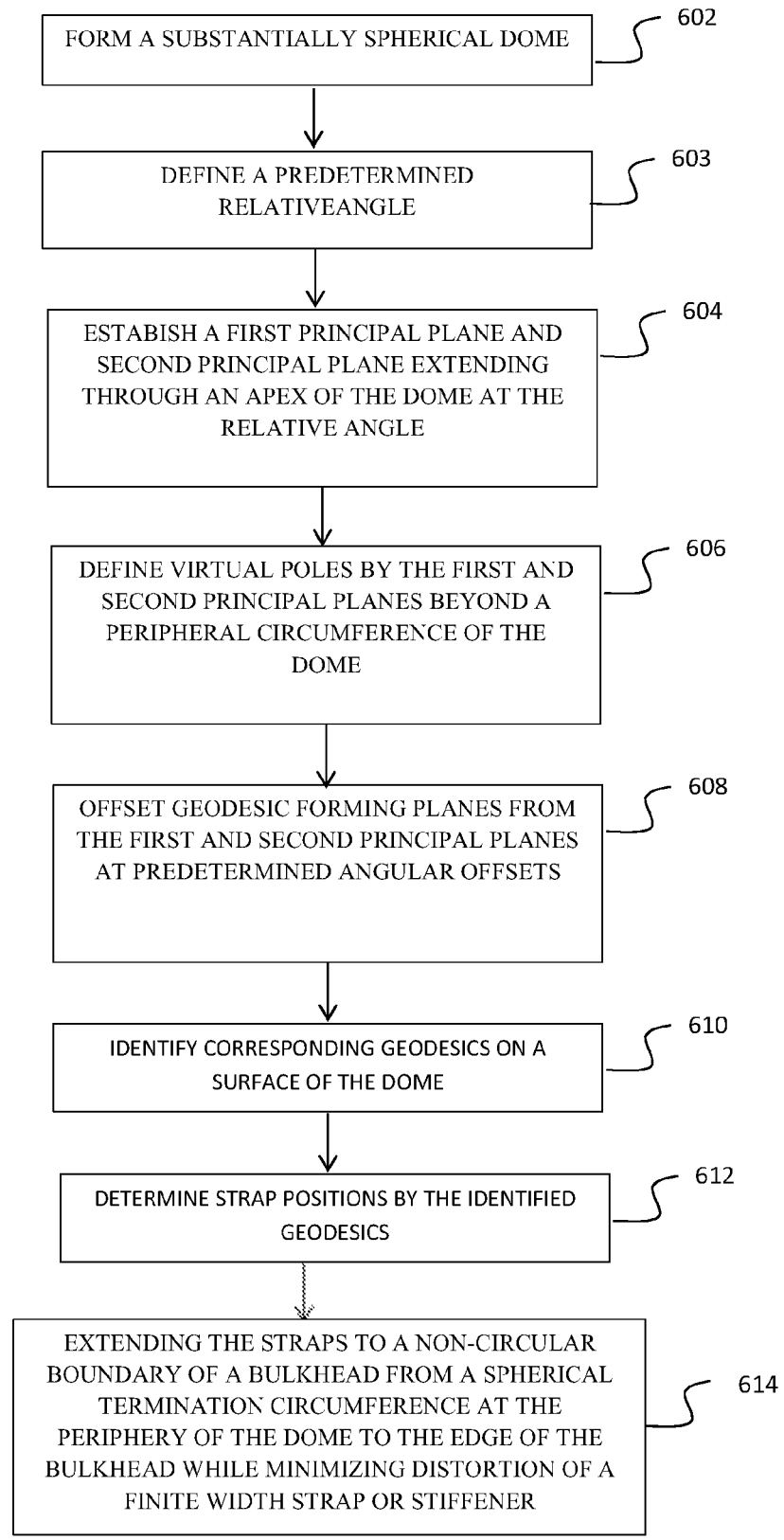
FIG. 6 is a flow chart for a method for producing embodiments of bulkheads as disclosed herein.

As described, the embodiments for strap placement and orientation on a structural dome may be accomplished using a method as shown in FIG. 6. A substantially spherical dome is formed, step 602. A predetermined relative angle is defined, step 603 and a first principal plane and second principal plane extending through an apex of the dome are established at the relative angle, step 604. Virtual poles are defined by the first and second principal planes beyond a peripheral circumference of the dome, step 606. Geodesic forming planes are offset from the first and second principal planes at predetermined angular offsets, step 608, and corresponding geodesics on a surface of the dome are identified, step 610. Strap positions are determined by the identified geodesics, step 612, resulting in only single overlaps of straps at intersection of the geodesics. Extension of the straps to a non-circular boundary of a bulkhead is accomplished by extending straps or stiffeners from a spherical termination circumference at the periphery of the dome to the edge of the bulkhead while minimizing distortion of a finite width strap or stiffener, step 614.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A bulkhead comprising:
a substantially spherical dome having a periphery and an apex with an axis perpendicular to the dome at the apex;
a first plurality of straps emanating from a periphery of the dome on geodesics defined by a first pair of virtual poles beyond the periphery of the dome; and,
a second plurality of straps emanating from the periphery of the dome on second geodesics defined by a second pair of virtual poles beyond the periphery of the dome, at least one of said first plurality of straps overlapping at least one of said second plurality of straps, wherein any overlap on an individual strap in the first plurality of straps is singular to only one individual strap in the second plurality of straps and any overlap intersperses plies from a first strap with plies from a second strap.

2. The bulkhead as defined in claim 1 wherein the first pair of virtual poles and second pair of virtual poles are orthogonal to the axis.

3. The bulkhead as defined in claim 1 wherein the second pair of virtual poles is perpendicular to the first pair of virtual poles.

4. The bulkhead as defined in claim 1 wherein the dome is shallow and subtends a conical angle of 45° or less of a spherical surface.

5. The bulkhead as defined in claim 1 wherein the dome is deep and subtends a conical angle of between 45° and 85° of a spherical surface.

6. The bulkhead as defined in claim 1 wherein all plies of the straps terminate at the periphery.

7. The bulkhead as defined in claim 1 further comprising a non-circular boundary, said substantially spherical dome comprising a portion of a web extending from the non-circular boundary.

8. A bulkhead comprising:
a substantially spherical dome having a periphery and an apex with an axis perpendicular to the dome at the apex;
a first plurality of straps emanating from a periphery of the dome on geodesics defined by a first pair of virtual poles beyond the periphery of the dome; and, a second plurality of straps emanating from the periphery of the dome on second geodesics defined by a second pair of virtual poles beyond the periphery of the dome, at least one of said first plurality of straps overlapping at least one of said second plurality of straps, wherein any overlap on an individual strap in the first plurality of straps is singular to only one individual strap in the second plurality of straps wherein plies of straps terminate in steps as the strap approaches the periphery.

9. The bulkhead as defined in claim 8 wherein any overlap is a simple overlap of straps.

10. The bulkhead as defined in claim 8 wherein any overlap intersperses plies from a first strap with plies from a second strap.

11. A bulkhead comprising:
a non-circular boundary;
a substantially spherical dome comprising a portion of a web extending from the non-circular boundary and having a periphery and an apex with an axis perpendicular to the dome at the apex;
a first plurality of straps emanating from a periphery of the dome on geodesics defined by a first pair of virtual poles beyond the periphery of the dome; and,
a second plurality of straps emanating from the periphery of the dome on second geodesics defined by a second pair of virtual poles beyond the periphery of the dome, at least one of said first plurality of straps overlapping at least one of said second plurality of straps, wherein any overlap on an individual strap in the first plurality of straps is singular to only one individual strap in the second plurality of straps;
wherein the first plurality of straps and the second plurality of straps extend beyond the periphery of the dome minimizing distortion of a finite width strap from a spherical termination circumference to the non-circular boundary.

12. The bulkhead as defined in claim 11 further comprising a non-circular boundary, said substantially spherical dome comprising a portion of a web extending from the non-circular boundary.

13. The bulkhead as defined in claim 11 wherein any overlap is a simple overlap of straps.

14. The bulkhead as defined in claim 11 wherein any overlap intersperses plies from a first strap with plies from a second strap.

15. A method for strap placement on a substantially spherical dome comprising:
forming substantially spherical dome having a periphery and an apex with an axis perpendicular to the dome at the apex;
defining a predetermined relative angle;
establishing a first principal plane and second principal plane extending through the apex of the dome at the relative angle;
defining virtual poles by the first and second principal planes beyond a peripheral circumference of the dome;
placing a plurality of first offset geodesic forming planes from the first principal plane and a plurality of second offset geodesic forming planes from the second principal plane at predetermined angular offsets;
identifying corresponding first and second pluralities of geodesics with the first and second plurality of offset geodesic forming planes on a surface of the dome;
determining strap positions for a first plurality of straps emanating from a periphery of the dome on said first plurality of geodesics defined by the virtual poles beyond the periphery of the dome and a second plurality of straps emanating from a periphery of the dome on said second plurality of geodesics defined by the virtual poles, said first plurality of straps and second plurality of straps overlapping with only a single overlaps of straps present at intersections of the geodesics and any overlap intersperses plies from a first strap with plies from a second strap.

16. The method of claim 15 wherein the predetermined relative angle is perpendicular.

17. The method of claim 15 wherein the predetermined angular offsets are equal.

18. The method of claim 15 further comprising:
extending the straps to a non-circular boundary of a bulkhead from a spherical termination of the peripheral circumference of the dome to the boundary of the bulkhead while minimizing distortion of a finite width strap.

* * * * *